United States Patent Office 2,917,549
Patented Dec. 15, 1959

2,917,549

PREPARATION OF TRANS-1,4-CYCLOHEXANE-DIMETHANOL

Robert H. Hasek and M B Knowles, Kingsport, Tenn., assignors to Eastman Kodak Company, Rochester, N.Y., a corporation of New Jersey No Drawing. Application January 7, 1958
Serial No. 707,462

15 Claims. (Cl. 260—617)

This invention relates to 1,4-cyclohexanedimethanol, and more particularly, to a process for preparing the trans isomer of 1,4-cyclohexanedimethanol.

The compound, 1,4-cyclohexanedimethanol, is prepared commercially by the hydrogenation of an ester of 1,4-cyclohexanedicarboxylic acid. This hydrogenation is typically effected by treating this ester with hydrogen at a pressure of about 5000 pounds per square inch and at a temperature of about 250° C. in the presence of a copper-chromium-oxide catalyst such as described in Lazier, U.S. 2,105,664. The resulting 1,4-cyclohexanedimethanol hydrogenation product is a mixture of two isomers which have different melting points. The prior art has designated the isomer melting at 43° C. the cis isomer, and the isomer melting at 67° C. the trans isomer. The cis and trans isomers in the hydrogenation reaction mixture occur as a mixture in which about 75% of the mixture is the trans isomer and about 25% is the cis isomer. Such a mixture of cis and trans isomers occurs even though the ester of 1,4-cyclohexanedicarboxylic acid from which the 1,4-cyclohexanedimethanol is prepared was initially in the cis isomeric form or the trans isomeric form.

The higher melting trans isomer of 1,4-cyclohexanedimethanol has considerable utility in the preparation of certain polyesters and polyester amides which can be used in fibers. The use of 1,4-cyclohexanedimethanol in the preparation of such materials is described in a copending application by Kibler et al., U.S. Serial No. 554,639, which was filed December 22, 1955. By employing larger proportions of the higher melting trans isomer of 1,4-cyclohexanedimethanol in preparing such polymeric materials, more of such melting point depressing materials as aliphatic dicarboxylic acids can be used in the polymer to enhance its dyeing properties without depressing the melting point of the polymer below the minimum temperature that can be tolerated in a commercial fiber. Thus, the higher melting trans isomer of 1,4-cyclohexanedimethanol is highly desired for this use.

Because of the difference in melting points between the cis and trans isomers of 1,4-cycyohexanedimethanol, the desired trans form can be readily separated from the 25-75 cis-trans hydrogenation equilibrium mixture. However, the residual mixture containing substantially more than about 25% cis isomer, cannot be readily isomerized back to a 25-75 cis-trans mixture so that more trans isomer can be separated out. Although isomerization takes place rapidly during the catalytic hydrogenation of esters of 1,4-cyclohexanedicarboxylic acid, mixtures of 1,4-cyclohexanedimethanol with high cis-isomer content are isomerized to mixtures enhanced in the trans isomer only at an impractically slow rate by hydrogenation catalysts. It is not possible, therefore, to separate trans-1,4-cyclohexanedimethanol from the usual 25-75 cis-trans mixture obtained in the hydrogenation step, and recycle the remaining cis isomer through the hydrogenation reactor to equilibrate it to a 25-75 cis-trans mixture again. The prior art reveals no practical method for isomerizing 1,4-cyclohexanedimethanol mixtures containing less than about 75% of the trans isomer to mixtures containing about 75% of the trans isomer.

It is accordingly an object of this invention to provide a novel process for isomerizing cis-1,4-cyclohexanedimethanol to trans-1,4-cyclohexanedimethanol.

It is another object of this invention to provide an improved method for converting a mixture of cis and trans isomers of 1,4-cyclohexanedimethanol containing substantially less than about 75% of the trans isomer to a mixture containing about 75% of the trans isomer.

It is still another object of the invention to provide an improved process for converting an equilibrium mixture of cis and trans isomers resulting from the hydrogenation of esters of 1,4-cyclohexanedicarboxylic acid to a mixture containing 90% or more of trans-1,4-cyclohexanedimethanol.

It is likewise an object of this invention to increase the melting point of an isomeric mixture of 1,4-cyclohexanedimethanol by an improved process.

These and other objects are accomplished by heating at an elevated temperature an isomeric mixture of 1,4-cyclohexanedimethanol containing less than about 75% of trans-1,4-cyclohexanedimethanol with catalytic amounts of a metal alkoxide and thereby substantially enhancing the proportion of trans-1,4-cyclohexanedimethanol in the mixture.

In the practice of the invention, the metal alkoxide catalyst is an alkoxide of a lower atomic weight reducing metal of the group which includes lithium, sodium, potassium, calcium and aluminum, or admixtures thereof. The present catalyst materials can be used in the form of such alkoxides as methylates, ethylates, isopropoxides, butylates, or related alkoxides, as well as metal alkoxides of 1,4-cyclohexanedimethanol itself. Accordingly, the nature of the non-metal moiety of the present catalyst material can be widely varied. However, lower aliphatic alkoxides containing 1-4 carbon atoms of the specified lower atomic weight reducing metals are readily available commercially and are more usually employed. Also, lithium, sodium, potassium, calcium and aluminum can be employed as metals or as compounds thereof to form an alkoxide catalyst with 1,4-cyclohexaanedimethanol in situ under the conditions of the present isomerization. Typical compounds that can be employed to form alkoxide catalysts in situ are sodium hydroxide, lithium hydroxide, patassium hydroxide, calcium oxide, aluminum oxide, lithium aluminum hydride, sodium borohydride, potassium borohydride, lithium borohydride and the like.

The isomerization of cis-1,4-cyclohexanedimethanol to the corresponding trans isomer according to the present isomerization process is effected at temperatures of at least about 200° C. and generally not more than 500° C. and more generally not more than 450° C. The present isomerization can be effected in either the liquid or vapor phases. Liquid phase isomerizations are preferably effected at temperatures of about 200°–300° C., and vapor phase isomerizations are preferably effected at temperatures of about 300°–450° C. Atmospheric, sub-atmospheric or super-atmospheric pressures can be used.

When the present isomerization process is effected in the liquid phase, the present metal alkoxides are employed in concentrations of at least about 0.1% by weight based on the 1,4-cyclohexanedimethanol, with concentrations of about 0.5–5% being more generally used. Higher concentrations of catalysts can be utilized but are not necessary to effect the isomerization. Also, as is the case in many catalyzed chemical reactions, superfluous catalyst material in the reaction complicates the recovery of the desired product. The heating of the cis and trans isomeric mixture of 1,4-cyclohexanedimethanol in the liquid phase in the presence of the present catalysts is carried out until the isomeric mixture is substantially enhanced with the trans isomer, and preferably until the isomeric mixture contains at least about 75% of the trans isomer. The time necessary to effect the desired isomerization in the liquid phase varies with the temperature and the basic metal alkoxide, with suitable isomerization periods usually varying from about 5 minutes to about 3 hours. Longer isomerization periods have been found not to be necessary in the present isomerization process. The liquid phase isomerization can be effected without a solvent as both the cis and trans isomers of 1,4-cyclohexanedimethanol can be maintained in a liquid state under the temperature conditions used to effect the isomerization by effecting the isomerization under pressure if needed. However, a suitable solvent or vehicle that is substantially inert to the catalyst material and 1,4-cyclohexanedimethanol can be employed if desired.

When the present isomerization is effected in the vapor or gaseous phase, an isomeric mixture of 1,4-cyclohexanedimethanol is conveyed into a reaction chamber containing the present catalyst material and heated to an elevated temperature as described above. Preferably the reaction chamber contains an inert gas such as nitrogen, helium, argon or the like. The material to be isomerized can be conveyed into the reaction chamber already in the vapor phase or in the liquid phase and converted to the vapor phase in the reaction chamber. The gaseous 1,4-cyclohexanedimethanol need be contacted with the catalyst material for only a relatively short time, typical apparent contact times are from about 2 to 15 seconds although shorter or longer contact times can be utilized, the contact time used varying with the catalyst and temperature employed. As used herein, the term "apparent contact time" is the reciprocal of the space velocity, at reaction temperature and pressure, converted to a base of seconds. After passing over the catalyst, the gaseous isomerized mixture of 1,4-cyclohexanedimethanol is condensed. Such a vapor phase isomerization has all the advantages of a continuous process as well as having relatively short isomerization times.

The cis-trans mixtures resulting from the isomerization of 1,4-cyclohexanedimethanol were found to contain 70–80% of the trans isomer and 20–30% of cis isomer, the cis/trans ratio varying with the catalyst and conditions employed. More generally, however, the cis-trans equilibrium mixtures produced by the present process contain about 75% of the trans isomer and about 25% of the cis isomer.

The desired high melting trans isomer can thereafter be readily separated from the lower melting cis isomer. A preferred method is to heat the equilibrium mixture of cis and trans isomers to a molten state and thereafter to cool the mixture to selectively crystallize out the trans isomer. The crystalline trans isomer can thereafter be separated from the liquid cis isomer by centrifuging. The trans isomer can also be separated from the cis isomer by selective crystallization from a suitable solvent. The use of a solvent to separate the trans from the cis isomer has the advantage in that simple filtration equipment can be used and higher recoveries of the trans isomer can generally be obtained in one crystallization operation. In general, oxygenated compounds, such as ketones, esters and ethers, in which 1,4-cyclohexanedimethanol has an appreciable but not an unlimited solubility can be used as solvents. Suitable solvents include ethyl acetate, isopropyl acetate, methyl isobutyl ketone, diisopropyl ketone, tetrahydrofuran, and mixtures of solvents such as methyl acetate and benzene. While the above-described freezing and solvent crystallization methods are effective for separating the trans isomer from the cis isomer, any other known method suitable for separating such materials can also be employed. If desired, the separated 1,4-cyclohexanedimethanol composition of enhanced trans isomer content can be subjected to distillation to remove residual amounts of catalyst therefrom.

The isomerization of cis-1,4-cyclohexanedimethanol to trans-1,4-cyclohexanedimethanol involves the isomerization or change in configuration of a hydrogen atom and a hydroxymethylene group ($-CH_2OH$) attached to a carbon atom of the cyclohexane ring. The net result is the change in relative positions of these two substituents as illustrated by the following equation:

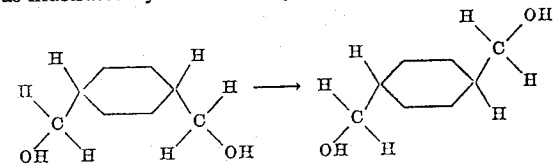

The present isomerization is to be distinguished from the isomerization of an alcohol in which the configuration of the carbon atom attached to the hydroxyl group is changed. The latter case is an example of the classic Walden inversion, and it is usually effected by relatively mild reagents and reaction conditions. In the present isomerization, the configuration of the carbon atom once removed from the hydroxyl group is changed.

Accordingly, the present process provides a novel and simple method for isomerizing the cis isomer of 1,4-cyclohexanedimethanol, which is normally difficult to isomerize, to mixtures enhanced in the corresponding trans isomer.

The invention is illustrated by the following examples which describe preferred embodiments thereof.

EXAMPLE 1

Several basic metal alkoxides were used in the isomerization of samples of 1,4-cyclohexanedimethanol containing 60% of the trans isomer and 40% of the cis isomer to enhance the trans isomer content thereof. The cis-trans mixtures were heated with the alkoxides under nitrogen for 2 hours at 200° C. The data in Table A below summarize the results of the isomerizations.

Table A

| Alkoxide | Percent by Weight of Alkoxide | Percent Trans Isomer | |
|---|---|---|---|
| | | Initial | Final |
| Sodium methoxide | 1.0 | 60 | 76 |
| Potassium methoxide | 1.0 | 60 | 76 |
| Potassium t-butoxide | 1.0 | 60 | 75 |
| Aluminum isopropoxide | 2.0 | 60 | 74 |

EXAMPLE 2

Samples of isomeric mixtures of 1,4-cyclohexanedimethanol were heated with various basic metals under a nitrogen atmosphere at varying temperatures and metal concentrations. The data in Table B below summarize the results of the isomerizations.

Table B

| Metal | Percent by Weight of Metal | Time, Hours | Temperature, °C. | Percent Trans Isomer | |
|---|---|---|---|---|---|
| | | | | Initial | Final |
| Sodium | 0.14 | 2 | 100 | 32 | 37 |
| Do | 0.14 | 2 | 200 | 32 | 76 |
| Do | 0.14 | 2 | 270 | 32 | 74 |
| Do | 0.10 | 1 | 150 | 60 | 60 |
| Do | 0.10 | 1 | 270 | 60 | 73 |
| Do | 0.10 | 2 | 200 | 60 | 71 |
| Potassium | 0.10 | 2 | 200 | 60 | 73 |
| Lithium | 0.50 | 2 | 225 | 60 | 70 |
| Aluminum | | | | | |

Hence, basic metals can be employed to form alkoxide catalysts with 1,4-cyclohexanedimethanol in situ which catalyze the isomerization of the cis isomer to the trans isomer. Also, the data in Table B illustrate that at temperatures appreciably less than about 200° C. the isomerization of cis-1,4-cyclohexanedimethanol to trans-1,4-cyclohexanedimethanol is significantly reduced.

EXAMPLE 3

The present alkoxide isomerization catalysts can also be formed in situ by adding metal hydroxides to the isomerization mixture. Samples of isomeric mixtures of 1,4-cyclohexanedimethanol were heated at varying temperatures, times and catalyst concentrations to enhance the isomeric mixtures with trans isomer. The data in Table C below summarize the results of the isomerizations.

Table C

| Hydroxide | Percent by Weight of Hydroxide | Time, Hours | Temperature, °C. | Percent Trans Isomer | |
|---|---|---|---|---|---|
| | | | | Initial | Final |
| Potassium hydroxide | 0.5 | 0.1 | 280 | 60 | 73 |
| Sodium hydroxide | 0.5 | 1.0 | 200 | 5 | 79 |
| Do | 0.5 | 0.5 | 225 | 60 | 76 |
| Do | 1.0 | 1.0 | 200 | 60 | 76 |

EXAMPLE 4

The present isomerization can also be effected in the vapor phase. A gaseous mixture of 5% nitrogen and 95% 1,4-cyclohexanedimethanol (56.5% cis isomer and 43.5% trans isomer) was fed at atmospheric pressure into a reaction vessel containing a calcium oxide contact mass of about 8–14 mesh and maintained at a temperature of 300° C. The apparent contact time of the gaseous 1,4-cyclohexanedimethanol with the catalyst was 9.6 seconds. The resulting gaseous mixture was thereafter condensed to yield a composition of 24% cis-1,4-cyclohexanedimethanol and 76% trans-1,4-cyclohexanedimethanol. About 95% of the 1,4-cyclohexanedimethanol introduced into the reaction vessel was recovered.

EXAMPLE 5

A gaseous mixture of 5% nitrogen and 95% 1,4-cyclohexanedimethanol (99% cis isomer) was fed at atmospheric pressure into a reaction vessel containing a catalyst contact mass of 10% potassium hydroxide on charcoal of about 8–14 mesh and maintained at 310° C. The apparent contact time of the feed gas with the catalyst contact mass was 10 seconds. The resulting gaseous mixture was thereafter condensed to yield a composition of 29.9% cis-1,4-cyclohexanedimethanol and 70.1% trans-1,4-cyclohexanedimethanol.

EXAMPLE 6

In an operation carried out at atmospheric pressure, a gaseous mixture containing 95% 1,4-cyclohexanedimethanol (37.5% cis isomer and 62.5% trans isomer) and 5% nitrogen was passed through a reaction zone containing a catalyst contact mass composed of 8–14 mesh silicon dioxide which had been washed with a 10% solution of sodium hydroxide. The contact mass had been previously heated to 310° C. and was maintained at this temperature throughout the reaction. The apparent contact time of the feed gas with the contact mass was 10 seconds. The resulting gaseous mixture was thereafter condensed to yield a composition of 29.9% cis-1,4-cyclohexanedimethanol and 70.1% trans-1,4-cyclohexanedimethanol.

EXAMPLE 7

A 1540 g. sample of molten 1,4-cyclohexanedimethanol comprised of 22% of the cis isomer and 78% of the trans isomer, such as typically result from the hydrogenation of dimethyl 1,4-cyclohexanedicarboxylate, was cooled to 40° C. and a few crystals of trans-1,4-cyclohexanedimethanol were added. As the molten composition was stirred, crystals separated. The heat of crystallization caused a slight rise in temperature. When equilibrium was established at 40° C., the slurry was centrifuged in a 12-inch Fletcher centrifuge which was flushed continuously with a stream of air at 40° C. After 1.5 hours of centrifuging, the resulting cake of crystals was removed. The removed cake of crystals weighed 505 g. and contained 98% trans-1,4-cyclohexanedimethanol. The liquid portion collected from the centrifuge was stirred at 25° C. to obtain another crop of crystals which were separated by centrifuging as before to give an additional 300 g. crystals containing 95% trans-1,4-cyclohexanedimethanol. The residual liquid portion contained 1,4-cyclohexanedimethanol at a cis/trans ratio of 45/55. This isomeric mixture was heated at 200° C. with 1% by weight of sodium hydroxide for an hour to obtain an isomeric mixture of 1,4-cyclohexanedimethanol at a cis/trans ratio of 24/76. Likewise, 1% portions of potassium hydroxide, lithium hydroxide, calcium oxide or aluminum oxide can be employed in lieu of the sodium hydroxide. The 1,4-cyclohexanedimethanol was removed from the catalyst by flash distillation under reduced pressure and the trans isomer was separated from the resulting mixture by freezing and centrifuging as described above. The residue from the flash distillation was used to catalyze the isomerization of another isomeric mixture of 1,4-cyclohexanedimethanol containing less than about 75% of the trans isomer.

EXAMPLE 8

The trans isomer can also be readily separated from the cis isomer in such cis-trans mixtures as were prepared by the methods described in Examples 1–4 with the use of solvents. A 4170 g. sample of 1,4-cyclohexanedimethanol comprised of 24% of the cis isomer and 76% of the trans isomer dissolved in 8.3 liters of ethyl acetate was cooled to 12° C. and stirred for three hours. The resulting slurry of crystals was filtered with suction, and the filter cake was washed with ethyl acetate at about 12° C. After being dried in air to remove the ethyl acetate solvent, the separated crystals weighed 2465 g. Analysis indicated that the crystalline product contained 94.5% trans-1,4-cyclohexanedimethanol. The remaining filtrate can thereafter be isomerized with a metal alkoxide in accordance with the present process to enhance its trans isomer content and thereafter the trans isomer again separated out as described in this example.

EXAMPLE 9

The trans isomer of 1,4-cyclohexanedimethanol has particular utility in the preparation of polyesters of higher melting points than can be prepared from cis-trans mixtures of 1,4-cyclohexanedimethanol. Several polyesters were prepared by reacting terephthalic acid with several cis and trans mixtures of 1,4-cyclohexanedimethanol in accordance with the procedure described in Kibler et al., U.S. Serial No. 554,639. As illustrated in Table D below, polyesters prepared from higher proportionate amounts of the trans isomer have high melting points.

Table D

| Percent Trans Isomer Content of 1,4-Cyclohexanedimethanol | Melting Point of Polyester, °C. |
|---|---|
| 0 | 257 |
| 70 | 290 |
| 80 | 300 |
| 90 | 309 |
| 100 | 318 |

EXAMPLE 10

Polyesters were prepared from a mixture of 75 mole percent of terephthalic acid and 25 mole percent of succinic acid and esterified with 1,4-cyclohexanedimethanol mixtures of varying trans isomer content. The resulting polyesters were spun into fibers and were subjected to the following tests:

(a) *Bar sticking temperature.*—The fiber sample, held under a preset tension, was pressed against a heated stainless steel bar by a weight for 15 seconds. The bar temperatures were determined at which, after removal of the weight, the fiber (1) stuck momentarily to the bear and (2) stuck for more than 10 seconds. These temperatures were recorded as a range of (1) to (2).

(b) *Flow point.*—The fiber sample, held under a preset tension, was contacted with a heated stainless steel bar for 5 seconds. The bar temperatures were determined at the point where the fiber failed under tension of 0.2 g./den. and 0.05 g./den.

(c) *Fabric stiffening point.*—Swatches of fabric made from the polyester fibers were pressed under a hot iron until the lowest iron temperature was found at which a fresh sample of fabric, pressed once under the iron for one minute, exhibited an empirically selected degree of stiffness. The properties of the polyesters are summarized in Table E below.

Table E

| Thermal Test | Percent Trans Isomer Content of 1,4-Cyclohexanedimethanol | | |
|---|---|---|---|
| | 80% | 91% | 100% |
| Melting Point, ° C | 264 | 270 | 298 |
| Bar Sticking Temperature, ° C | 209–213 | 215–222 | 216–224 |
| Flow Temperature, 0.2 g./den., ° C | 233 | 236 | 242 |
| Flow Temperature, 0.05 g./den., ° C | 238 | 247 | 256 |
| Fabric Stiffening Temperature, ° C | 200 | 213 | 225 |

The data in Table E above demonstrate the improvement in heat distortion properties of a modified polyester produced by using 1,4-cyclohexanedimethanol of high trans isomer content in the formulation. Thus, the present invention for isomerizing cis-1,4-cyclohexanedimethanol to trans-1,4-cyclohexanedimethanol is a particularly useful step in the manufacture of polyesters of improved properties.

As pointed out hereinabove, 1,4-cyclohexanedimethanol is prepared commercially by the catalytic hydrogenation of an ester of 1,4-cyclohexanedicarboxylic acid. The product of such a hydrogenation is a mixture containing about 25% of the cis isomer and about 75% of the trans isomer, such a mixture being formed even though the starting ester of 1,4-cyclohexanedicarboxylic acid initially was in the cis isomeric form. However, conventional hydrogenation catalysts are not effective for isomerizing cis 1,4-cyclohexanedimethanol to mixtures enhanced in the corresponding trans isomer. Example 11 below illustrates the ineffectiveness of typical hydrogenation catalysts under hydrogenation conditions to effect the present isomerization.

EXAMPLE 11

Several cis and trans isomeric mixtures of 1,4-cyclohexanedimethanol were subjected to typical hydrogenation conditions in the presence of about 1% by weight of the hydrogenation catalyst. Table F below summarizes the results of the attempted isomerizations.

Table F

| Catalyst | Temperature, ° C. | Time, Hours | Hydrogen Pressure, P.s.i.g. | Percent Trans Isomer | |
|---|---|---|---|---|---|
| | | | | Initial | Final |
| Copper-Chromium-Oxide | 200 | 5 | 1,000 | 40 | 47 |
| Do | 240 | 5 | 5,000 | 63 | 66 |
| Raney Nickel | 200 | 1 | 100 | 60 | 62 |

Although the invention has been described in detail with particular reference to certain typical embodiments, it will be understood that variations and modifications can be effected within the spirit and scope of the invention as described hereinabove and as defined in the appended claims.

We claim:

1. The process for isomerizing cis-1,4-cyclohexanedimethanol to trans-1,4-cyclohexanedimethanol which comprises heating cis-1,4-cyclohexanedimethanol at a temperature of at least 200° C. in the presence of an alkoxide of a lower atomic weight metal selected from the group consisting of lithium, sodium, potassium, calcium and aluminum.

2. The process according to claim 1 wherein the said metal is lithium.

3. The process according to claim 1 wherein the said metal is sodium.

4. The process according to claim 1 wherein the said metal is potassium.

5. The process according to claim 1 wherein the said metal is calcium.

6. The process according to claim 1 wherein the said metal is aluminum.

7. The process for increasing the amount of trans-1,4-cyclohexanedimethanol in a cis and trans isomeric mixture of 1,4-cyclohexanedimethanol containing substantially less than about 75% of trans-1,4-cyclohexanedimethanol which comprises heating said cis and trans isomeric mixture in the liquid phase at a temperature of 200°–300° C. in the presence of at least 0.1% by weight of an alkoxide of a lower atomic weight metal selected from the group consisting of lithium, sodium, potassium, calcium and aluminum.

8. The process according to claim 7 wherein the said metal is lithium.

9. The process according to claim 7 wherein the said metal is sodium.

10. The process according to claim 7 wherein the said metal is potassium.

11. The process according to claim 7 wherein the said metal is calcium.

12. The process according to claim 7 wherein the said metal is aluminum.

13. The process for increasing the amount of trans-1,4-cyclohexanedimethanol in a cis and trans isomeric mixture of 1,4-cyclohexanedimethanol containing substantially less than about 75% of trans-1,4-cyclohexanedimethanol which comprises heating said cis and trans isomeric mixture in the vapor phase at a temperature of 300°–450° C. in the presence of an alkoxide of a lower atomic weight metal selected from the group consisting of sodium, potassium and calcium.

14. The process for recovering trans-1,4-cyclohexanedimethanol from a cis and trans isomeric equilibrium mixture of 1,4-cyclohexanedimethanol resulting from the hydrogenation of an ester of 1,4-cyclohexanedicarboxylic acid which comprises separating a substantial portion of trans-1,4-cyclohexanedimethanol from said equilibrium mixture, heating the remaining trans isomer depleted mixture in the liquid phase at a temperature of 200°–300° C. with 0.5–5% by weight of an alkoxide of a lower atomic weight metal selected from the group consisting of lithium, sodium, potassium, calcium and aluminum, and thereby enhancing said depleted mixture with trans-1,4-cyclohexanedimethanol, and thereafter repeating the said sequential steps.

15. The process for recovering trans-1,4-cyclohexanedimethanol from a cis and trans isomeric equilibrium mixture of 1,4-cyclohexanedimethanol resulting from the hydrogenation of an ester of 1,4-cyclohexanedicarboxylic acid which comprises separating a substantial portion of trans-1,4-cyclohexanedimethanol from said equilibrium mixture, heating the remaining trans isomer depleted mixture in the liquid phase at a temperature of 200°–300° C. with 0.5–5% by weight of sodium hydroxide and thereby enhancing said depleted mixture with trans-1,4-cyclohexanedimethanol, and thereafter repeating the said sequential steps.

References Cited in the file of this patent

Haggis et al.: Jour. Chem. Soc. (1953), pgs. 404–407.